United States Patent
Thukkaram et al.

(10) Patent No.: US 9,208,058 B2
(45) Date of Patent: Dec. 8, 2015

(54) PROVIDING DIRECTIONAL DEBUGGING BREAKPOINTS

(71) Applicant: Oracle International Corporation, Redwood Shores, CA (US)

(72) Inventors: Prabhu Thukkaram, San Ramon, CA (US); Philip Zampino, Shamong, NJ (US); Jordan Raykov, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 58 days.

(21) Appl. No.: 13/756,213

(22) Filed: Jan. 31, 2013

(65) Prior Publication Data

US 2014/0215441 A1    Jul. 31, 2014

(51) Int. Cl.
    G06F 9/44    (2006.01)
    G06F 11/36    (2006.01)
(52) U.S. Cl.
    CPC .......... *G06F 11/362* (2013.01); *G06F 11/3664* (2013.01)
(58) Field of Classification Search
    CPC .......... G06F 11/362; G06F 11/3636; G06F 11/3664
    USPC .......... 717/124–125, 131
    See application file for complete search history.

(56) References Cited

U.S. PATENT DOCUMENTS

| | | | |
|---|---|---|---|
| 4,383,312 A * | 5/1983 | Reed | 714/738 |
| 8,161,460 B2 * | 4/2012 | Drumm et al. | 717/126 |
| 2002/0120918 A1 * | 8/2002 | Aizenbud-Reshef et al. | 717/127 |
| 2002/0120919 A1 * | 8/2002 | Aizenbud-Reshef et al. | 717/127 |
| 2002/0188930 A1 * | 12/2002 | Moser et al. | 717/129 |
| 2005/0149908 A1 * | 7/2005 | Klianev | 717/109 |
| 2008/0059436 A1 * | 3/2008 | Crocker | 717/109 |
| 2008/0189679 A1 * | 8/2008 | Rodriguez et al. | 717/105 |
| 2012/0131559 A1 * | 5/2012 | Wu et al. | 717/132 |
| 2012/0272217 A1 * | 10/2012 | Bates | 717/125 |

OTHER PUBLICATIONS

Netzer et al., "Debugging Race Conditions in Message-Passing Programs," ACM, 1996, 10pg.*
Tsiatsoulis et al., "Testing and Debugging Message Passing Programs in Synergy with their Specifications," Fundamenta Informaticae 31, No. 3, Feb. 2000, 26pg.*
Venkatesan et al., "Testing and Debugging Distributed Programs Using Global Predicates," IEEE, 1995, 15pg.*

* cited by examiner

*Primary Examiner* — Ryan Coyer
(74) *Attorney, Agent, or Firm* — Kilpatrick Townsend & Stockton LLP

(57) ABSTRACT

Techniques for debugging an application are provided. In some examples, a user interface (such as a graphical user interface) is provided for a user to specify a breakpoint associated with a breakpoint location in an application and a message flow direction associated with the breakpoint. The message flow direction may be selected from one or more message flow directions associated with the breakpoint location. For example, a message flow direction may be a request message flow direction or a reply message flow direction. The breakpoint location may be a logical breakpoint location associated with a component in a component-based application such as an application based on Service Component Architecture (SOA). In an embodiment, an execution of the application is suspended when the breakpoint is reached in connection with the specified message flow direction.

18 Claims, 12 Drawing Sheets

US 9,208,058 B2

PROVIDING DIRECTIONAL DEBUGGING BREAKPOINTS

BACKGROUND OF THE INVENTION

Service Component Architecture (SCA) provides a standardized framework for aggregating disparate enterprise Service Oriented Architecture (SOA) components, such as Web services, into a higher-level composite application. A typical SCA composite application may contain several thousand lines of code to process orchestrations, message transformations, message routing, human workflow interactions, business rules processing and the like. As such, the process for troubleshooting an SCA composite application can be tedious and complex.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Embodiments of the present invention provide techniques that allow users to set debugging breakpoints associated with particular message flow direction. In an embodiment, a user interface (such as graphical user interface (GUI) and/or an integrated development environment (IDE)) is provided for a user to specify a breakpoint associated with a breakpoint location in an application and a message flow direction associated with the breakpoint. The message flow direction may be selected from one or more message flow directions associated with the breakpoint location. The message flow directions may be associated with a message exchange pattern such as a request-reply pattern or a one-way pattern. In an embodiment, the user interface may allow a user to create a request breakpoint, a reply breakpoint or both for a particular breakpoint location. The user interface may also enable the user to add, remove, enable, disable or otherwise configure the breakpoints and their directions.

In an embodiment, the application may be based on Service-Oriented Architecture (SOA) technologies. For example, the application may be a Service Component Architecture (SCA) composite application that includes one or more components. The breakpoint locations for an SCA composite application may include composite services, composite references, component services or component references.

In an embodiment, when a breakpoint is reached during an execution of the application in connection with the user-specified message flow direction (e.g., request or response processing), the execution is suspended to provide context information such as call stack information, variable values and the like via the user interface. A user may choose to resume execution of the application via the user interface. On the other hand, the execution may not be suspended when the same breakpoint location is reached in connection with another message flow direction for which the user does not set a breakpoint.

The foregoing, together with other features and embodiments, will become more apparent upon referring to the following specification, claims, and accompanying drawings.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION OF THE INVENTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Embodiments of the present invention provide techniques that allow users to set debugging breakpoints associated with particular message flow directions in an application causing execution of the application to be paused or suspended when the breakpoints are reached in the respective message flow directions.

Figure 1:
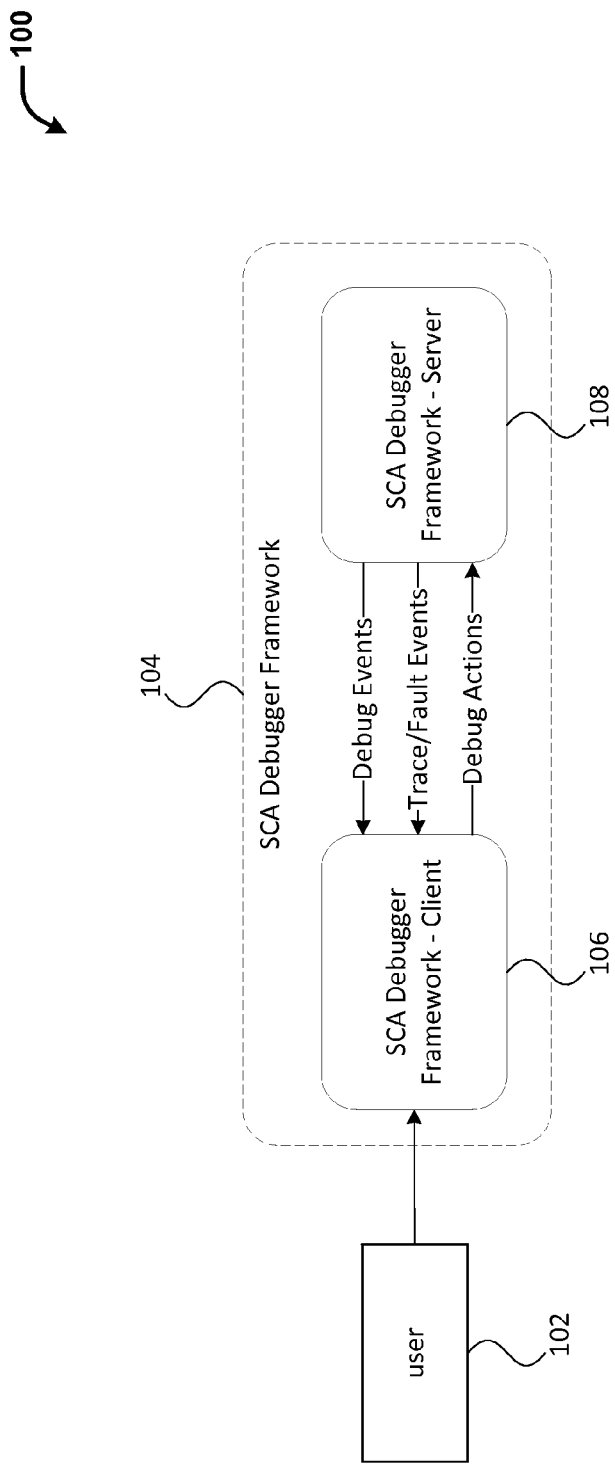
FIG. 1 illustrates an example environment for debugging an SCA composite application, in accordance with at least one embodiment.

FIG. 1 illustrates an example environment 100 for debugging an SCA composite application, in accordance with at least one embodiment. In an embodiment, users are provided the ability to debug a SCA composite application, for example, in an integrated development environment (IDE). As used herein, an SCA composite application refers to a loosely-coupled composition of any number of loosely components, each implementing a portion of the business functionality or logic required to make the composite application useful. Components of an SCA composite application may include any Web services, business rules, Business Process Execution Language (BPEL) processes, Business Process Model and Notation (BPMN) processes, human tasks, adapters (such as used to bridge incompatible communication protocols and data formats), mediator (such as used to provide content-based routing and transformation) and the like. The components can be local (e.g., a BPEL process or an adapter for Java EE Connector Architecture (JCA)) or remote using a protocol such as Web services. In addition, a component may be associated with one or more properties that may be customized within a particular use or deployment.

A composite application may provide well-defined entry points associated with the composite or components contained therein that may be used by other components within the same composite application or by external components or composite applications. As used herein, a composite service refers to an entry point associated with a composite application whereas a component service refers to an entry point associated with a component. Besides entry points or services, a composite application or component may also depend on other internal or external components or composite applications. As used herein, a composite reference refers to a dependency from a composite application whereas a component reference refers to dependency from a component. Components, services and references described above may be connected using wires.

In an embodiment, an SCA composite application may be developed using an integrated development environment (IDE). Such an IDE may provide a framework for developing (e.g., building and debugging), management and/or deployment of an SCA composite application. Such an IDE may include a graphical user interface (GUI) that allows a user to build, wire or otherwise configure components in the SCA composite application in a user-friendly fashion such as using drag-and-drop. As described above, a built-out SCA composite application may include services, components, references, properties and wires connecting the above. In some embodiments, metadata describing the configuration of an SCA composite application may be stored in a unifying metadata file (e.g., an Extensible Markup Language (XML)) file and deployed to a metadata store (MDS) that may be used for the composite application during both design time and runtime. In an embodiment, an SCA composite application may be deployed to a server, such as a WebLogic Application Server, that provides runtime infrastructures such as service engines for running the SCA composite and components such as BPEL processes, business rules invocation and the like. The runtime infrastructure may also include policy management, business activity monitoring, identity based security and the like.

As illustrated in FIG. 1, one or more users 102 may connect to components of an SCA debugger framework 104 to debug an SCA composite application. The users 102 may include software developers, business process designers, deployment engineers, system administrators and the like. In some cases, users 102 may include automated processes. In an embodiment, the SCA debugger framework 104 is implemented by a client component 106 and a server component 108. The client component may provide an interface such as a graphical user interface (e.g., an IDE), a web interface, a command-line tool and the like, for a user to perform debugging-related tasks such as pausing and resuming the running of an instance of an application, viewing and/or editing contextual information (e.g., variables, properties) during the running of the application, modifying, building and/or deploying the application and the like. In an embodiment, the client component may be implemented as part of an application or tool (such as an IDE or command-line tool) on a computing device operated by the user 102, a front end of a web service operated by a service provider and the like.

In an embodiment, the SCA debugger framework 104 includes a server component 108 configured to provide runtime support or infrastructure for the debugging of an SCA composite application. For example, the server component 108 may provide service engines for running the SCA composite and components such as BPEL processes, business rules invocation and the like, policy management, business activity monitoring, identity based security and the like. Additionally, the server component 108 may be configured to manage the execution of an instance of an SCA composite application and providing debugging information to the client component 106. For example, the server component 108 may be responsible for monitoring the triggering of certain debugging events (e.g., the reaching of a breakpoint or a pre-defined condition) that may be defined by the user and notify the client component 106 of the occurrence of the debugging events and relevant information. In some embodiments, the server component 108 may also notify the client component 106 events for the purpose of tracing or fault handling. Faults may include user-defined fault conditions that may be specific to the application, system generated runtime errors and the like.

In some embodiments, the client component 106 may process the information (e.g., related to debug, trace and/or fault events) received from the server component 108 and/or provide the server component 108 with instructions or messages for debug actions (e.g., stepping into or stepping over a subroutine, continue with execution and the like) based on user input. In some embodiments, the client component 106 may display contextual information during the debugging process based on information received from the server component 108 and/or provide logging or tracing functionalities. In some embodiments, the server component 108 may be implemented by one or more virtual, logical or physical computer systems or any combination thereof. In some embodiments, the server component 108 and the client component 106 may be implemented by the same or different computer systems. For example, in some embodiments, the server component 108 and the client component 106 may be co-located on the same physical computer or they may commute remotely over a network such as the Internet, local area network ("LAN"), wide area network ("WAN"), wireless data network or any other data network.

Figure 2:
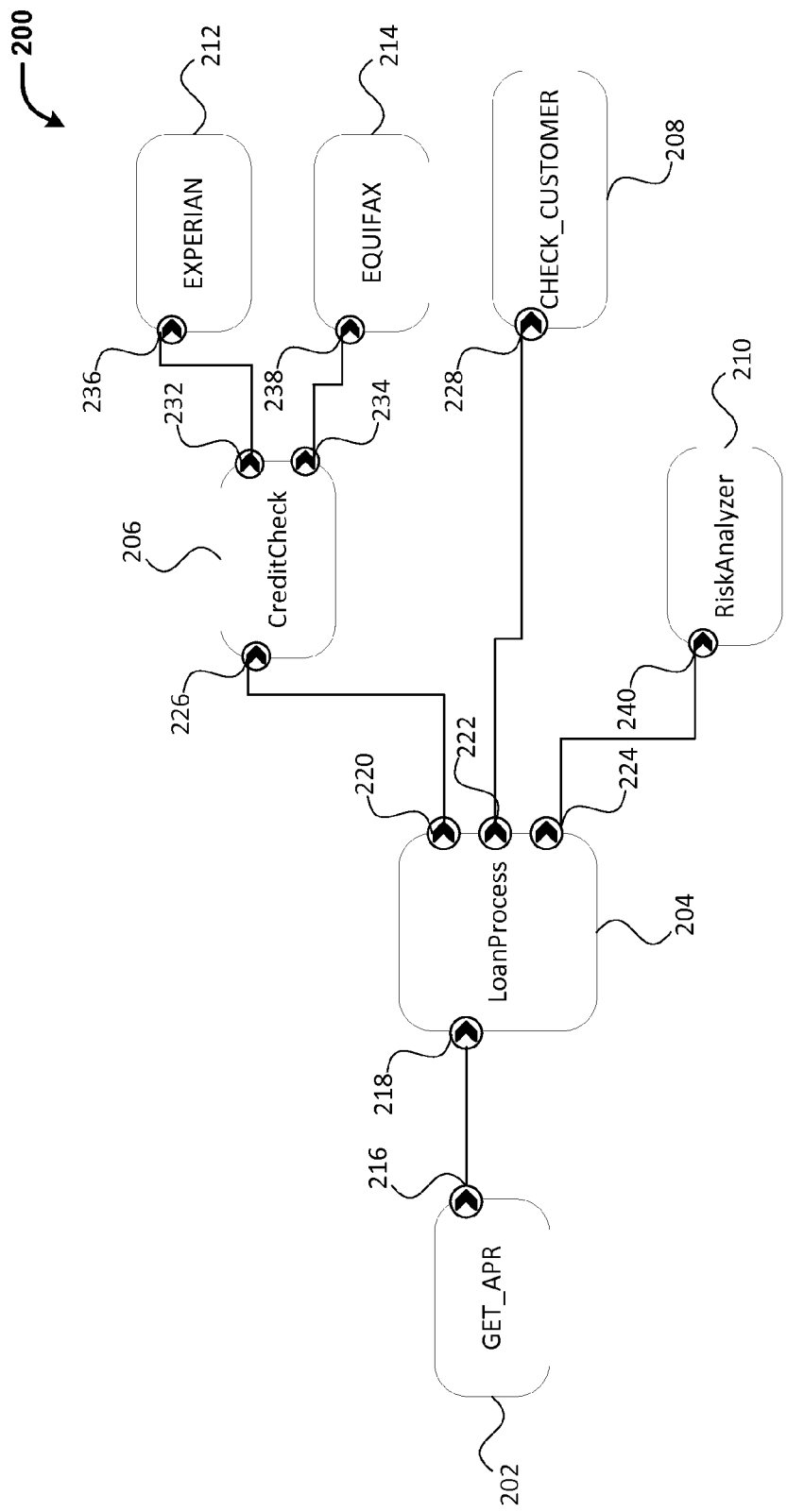
FIG. 2 illustrates an example graphical representation of an SCA composite application, in accordance with at least one embodiment.

FIG. 2 illustrates an example graphical representation 200 of an SCA composite application, in accordance with at least one embodiment. The example SCA composite application may be used, for example, by a financial institute, to determine an annual percentage rate (APR) for a particular customer. In some embodiments, the graphical representation 200 may be provided by an SCA composite application editor such as an IDE described above. As illustrated, the SCA composite application exposes an entry point 216 to the application via the GET_APR component 202. In other words, the entry point 216 represents a composite service. The GET_APR component 202 be implemented as a web service that take as input information related to a customer such as his or her social security number, annual income, and the like, and returns an APR rate.

As illustrated, the GET_APR component 202 invokes another LoanProcess component 204 via the latter's entry point 218 (i.e., component service). The LoanProcess component 204 may include a BPEL process that implements the logic and functionality of processing a loan request. The LoanProcess component 204 may, in turn, invoke other components such as CreditCheck 206, CHECK_CUSTOMER 208 and RiskAnalyzer 210 via their respective service points 226, 228 and 240. In particular, the CreditCheck component 206 may implement the logic to check a customer's credit scores with various credit reporting agencies such as Experian and Equifax, by invoking local or remote web services components such as the EXPERIAN component 212 and the EQUIFAX component 214. The LoanProcess component 204 may also invoke a web service component CHECK_CUSTOMER 208 that performs background checks (e.g., criminal history) of a customer. In addition, the LoanProcess component 204 may invoke the RiskAnalyzer component 210 process the results returned by the referenced components such as CreditCheck 206 and CHECK_CUSTOMER 208 and to determine a risk level associated with a loan. Based on the risk level, the LoanProcess component 204 may provide information to the GET_APR component 202 that is useful for calculating an appropriate APR. Finally, the GET_APR component 202 may provide an APR rate as a response to an entity invoking the composite application.

In some embodiments, a user may be able to create one or more breakpoints at specific locations on the execution path of an application such as at the composite service, composite reference, component service and component reference points such as illustrated in FIG. 2. The breakpoints would typically cause a running instance of the application to pause at those breakpoint locations until the user issues further debugging commands such as step into, step over, continue and the like.

In some embodiments, a breakpoint location may be reached by an execution of an SCA composite application in more than one message flow or message processing directions. As used herein, one or more message flow directions may be associated with a message exchange pattern (MEP) required by a communication protocol. Examples of message exchange patterns include request-response pattern such as required by the Hyptertext Transfer Protocol (HTTP), one-way pattern such as required by the User Datagram Protocol (UDP) and the like. As used herein, a request-response MEP exists where a requestor of information sends a request message to a system which receives, processes and returns a message in response. As such, a request-response MEP includes two message flow directions, a request message flow direction and a response message flow direction. In some embodiments, a protocol may be associated with multiple MEP types. For example, the Simple Object Access Protocol (SOAP) has several MEP types such request-response, one-way and the like.

In some embodiments, the request-response MEP may be implemented synchronously where the connection between the requestor and the replier is held open until a response provided or until a timeout period expires. Examples of synchronous implementation of the request-response MEP includes web service calls made over HTTP. In other embodiments, the request-response MEP may be implemented asynchronously where a response may be provided at an unknown later time. Asynchronous implementation of the request-response MEP may be used where time-intensive tasks or human workflow need to be performed before a response can be provided.

In an embodiment, a user may be allowed to associate (e.g., using an IDE such as described in connection with FIG. 1) a message flow direction with a breakpoint in an application such that an execution of the application is suspended or paused only when the breakpoint location is reached in connection with the user-specified message flow direction or directions. The advantage of setting breakpoints for distinct directions of message flow is that the user can focus troubleshooting efforts on a particular direction of message flow. This may be desirable, for example, when the user does not wish to pause execution of an application in connection with certain message flow direction (e.g., request-processing) because he or she knows the correctness or validity of the application regarding that particular message flow direction. For example, if a user knows that at a given breakpoint location (such as a service entry point of a SCA component), an incoming request message is well-formed and valid or if the logic for handling a request message is valid, the user only set a breakpoint for the response-processing direction and not set a breakpoint for the request-processing direction.

Figure 3:
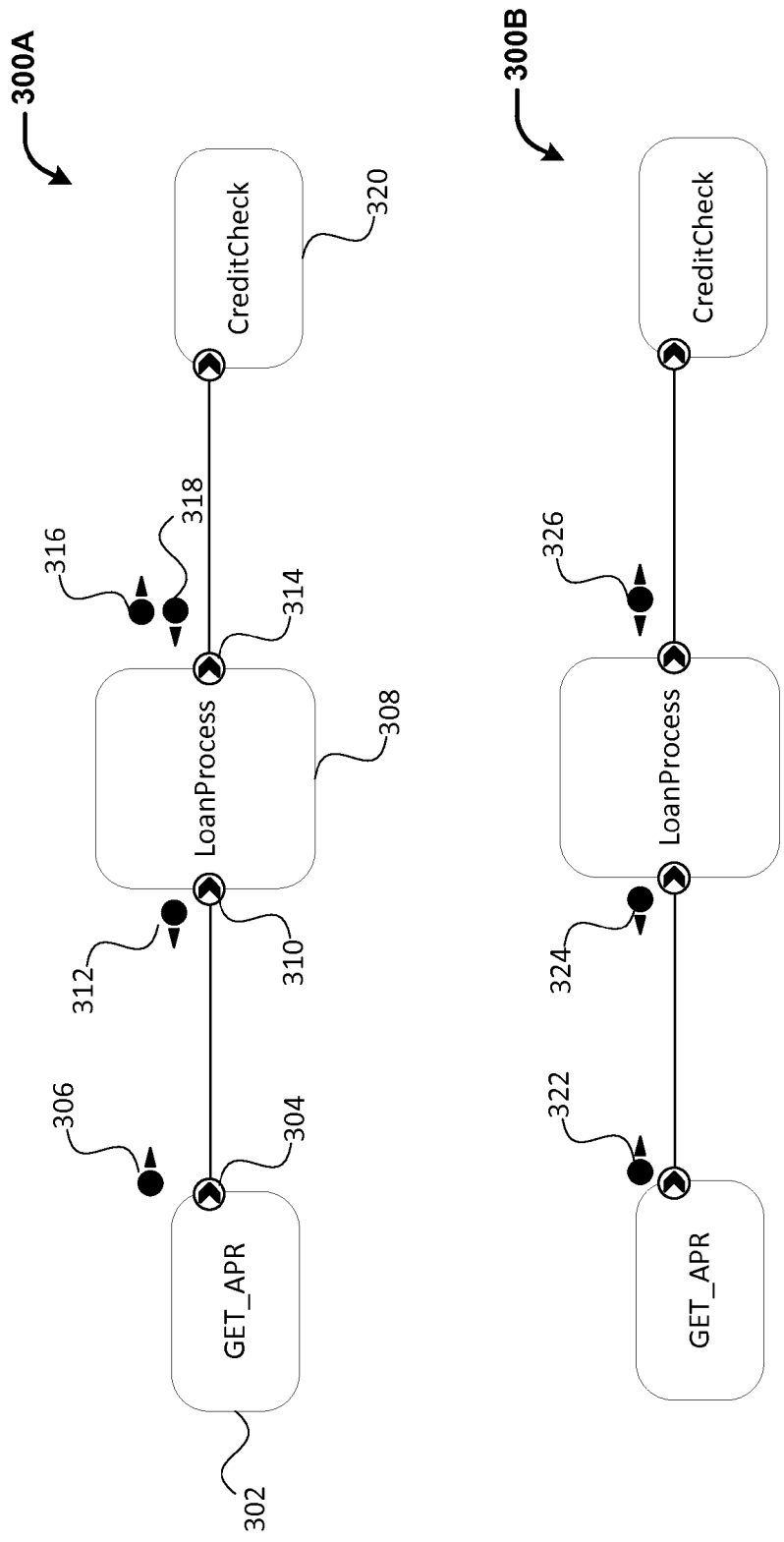
FIG. 3 illustrates examples of graphical representation of breakpoints in an SCA composite application, in accordance with at least one embodiment.

FIG. 3 illustrates examples of graphical representation 300A-B of breakpoints in an SCA composite application, in accordance with at least one embodiment. As shown in graphical representation 300A, a breakpoint is represented by a dot with an arrow to the left or right of the dot to indicate the message flow direction associated with the breakpoint. A right arrow is associated with a request breakpoint and a left arrow is associated with a reply breakpoint. As used herein, a request breakpoint refers to a breakpoint associated with a request message flow direction or request processing execution path. Likewise, a reply, response or return breakpoint refers to a breakpoint associated with a response or reply message flow direction or response or reply processing execution path. As such, graphical representation 300A illustrates a one-to-one relationship between breakpoints and message flow directions.

As graphical representation 300A illustrates, a request breakpoint 306 is set for the GET_APR component 302 at the composite entry point 304 such that the execution of the composite application will be suspected when the application is invoked. Because no reply breakpoint is set at location 304, the execution of the application will not be paused when GET_APR returns. On the other hand, a reply breakpoint 312 is set for the LoanProcess component 308 at the service entry point 310 such that an execution of the application will pause when the LoanProcess component 308 returns. Additional, both a request breakpoint 316 and a reply breakpoint 318 are set at the reference point 314 of the LoanProcess component 308 to the CreditCheck component 320. Therefore, the execution of the application will pause both when the LoanProcess component 308 invokes the CreditCheck component 320 and when a reply from CreditCheck component 320 is received by the LoanProcess component 308.

In some embodiments, when a breakpoint is encountered, a user may then have the option to step into the execution of a component, step over to the next component or continue execution until the next applicable breakpoint is reached. For example, as illustrated in graphical representation 300A, when the return breakpoint 318 is reached, the user may step into the detailed execution steps of the LoanProcess component 308, step over the LoanProcess component 308 to the next GET_APR component 302 or continue until the next breakpoint is reached (reply breakpoint 312 in this case).

The graphical representation 300B is similar to graphical representation 300A, discussed above, except that graphical representation 300B illustrates a one-to-many relationship between a breakpoint and message flow directions. In other words, a single breakpoint may be used associated with one or more message flow directions. Thus, the request breakpoint 322 and reply breakpoint 324 are similar to request breakpoint 306 and reply breakpoint 312 shown in graphical representation 300A. However, the request breakpoint 316 and reply breakpoint 318 are now combined into a single request/reply breakpoint 326 indicated by a dot with arrows on both sides.

Other variations of graphical representation of the directional breakpoints are also within the scope of the invention. In various embodiments, the graphical representation of breakpoints such as shown in FIG. 3 may be independent from the actual implementation of the breakpoints, discussed later. In some embodiments, a breakpoint location (a location where a breakpoint may be set) is restricted to be one of a set of valid and/or pre-defined locations. For example, in an embodiment, a user may only set breakpoints at service or reference points associated with SCA components. In other embodiments, a breakpoint may be set at any line of the source code of the application. In some embodiments, a breakpoint location refers to a logical location such as illustrated in a graphical representation of a component. The logical location may correspond to one or more physical locations in the source or executable code of the application.

Figure 4:
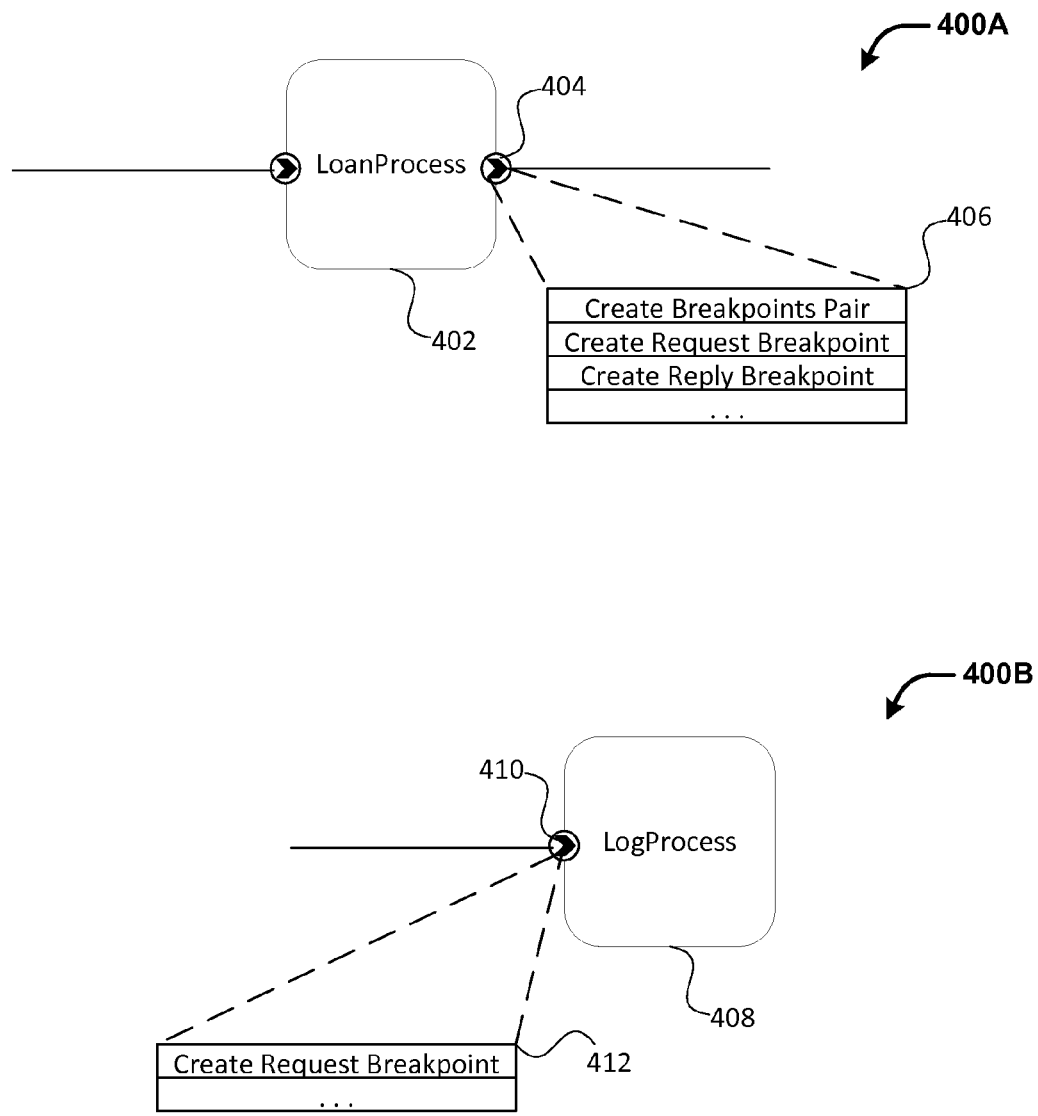
FIG. 4 illustrates example graphical user interfaces (GUIs) for a user to specify directional breakpoints, in accordance with at least two embodiments.

In various embodiments, a user interface may be provided to enable a user to configure directional breakpoints as discussed herein, for example, in an IDE discussed above. For example, FIG. 4 illustrates example graphical user interfaces (GUIs) 400A-B for a user to specify directional breakpoints, in accordance with at least two embodiments. According to GUI 400A, a menu 406 associated with a breakpoint location 404 of an SCA component 402 may be displayed in response to a user action such as right-clicking on or otherwise selecting the breakpoint location 404. The menu 406 may include menu items for creating breakpoints associated with different message flow directions. In the illustrated example, the menu 406 includes a menu items for creating a pair of breakpoints. The selection of this menu item may result in the creation of the request breakpoint 316 and reply breakpoint 318 as shown in FIG. 3. The menu 406 also includes a menu item for creating a request breakpoint only and for creating a reply breakpoint only. The selection of these menu items may respectively result in the creation of a request breakpoint such as request breakpoint 306 and the creation of a reply breakpoint such as reply breakpoint 312 shown in FIG. 3.

In some embodiments, the content of the menu associated with a breakpoint location may be context-specific to the breakpoint location. For example, the menu items included in the menu may depend on the MEP associated with the particular component or composite to which the menu is associated with. In an embodiment, if the breakpoint location is only reachable in one way of communication (e.g., request), the menu associated with the breakpoint location may include only one option to create a one way breakpoint. As illustrated by GUI 400B, component LogProcess 408 may be configured to receive a request and do some work (e.g., writing to a log file) without sending a response back to the requestor. In such a case, a user may be presented with a menu 412 associated with the service point 410 of the component 408 that includes the option to set a request breakpoint but not an option to set a reply breakpoint. On the other hand, if the breakpoint location is reachable in multiple message flow directions, the menu associated with the breakpoint location may include options to create a breakpoint for any subset (including all) of such the message flow directions, such as shown in GUI 400A.

Figure 5:
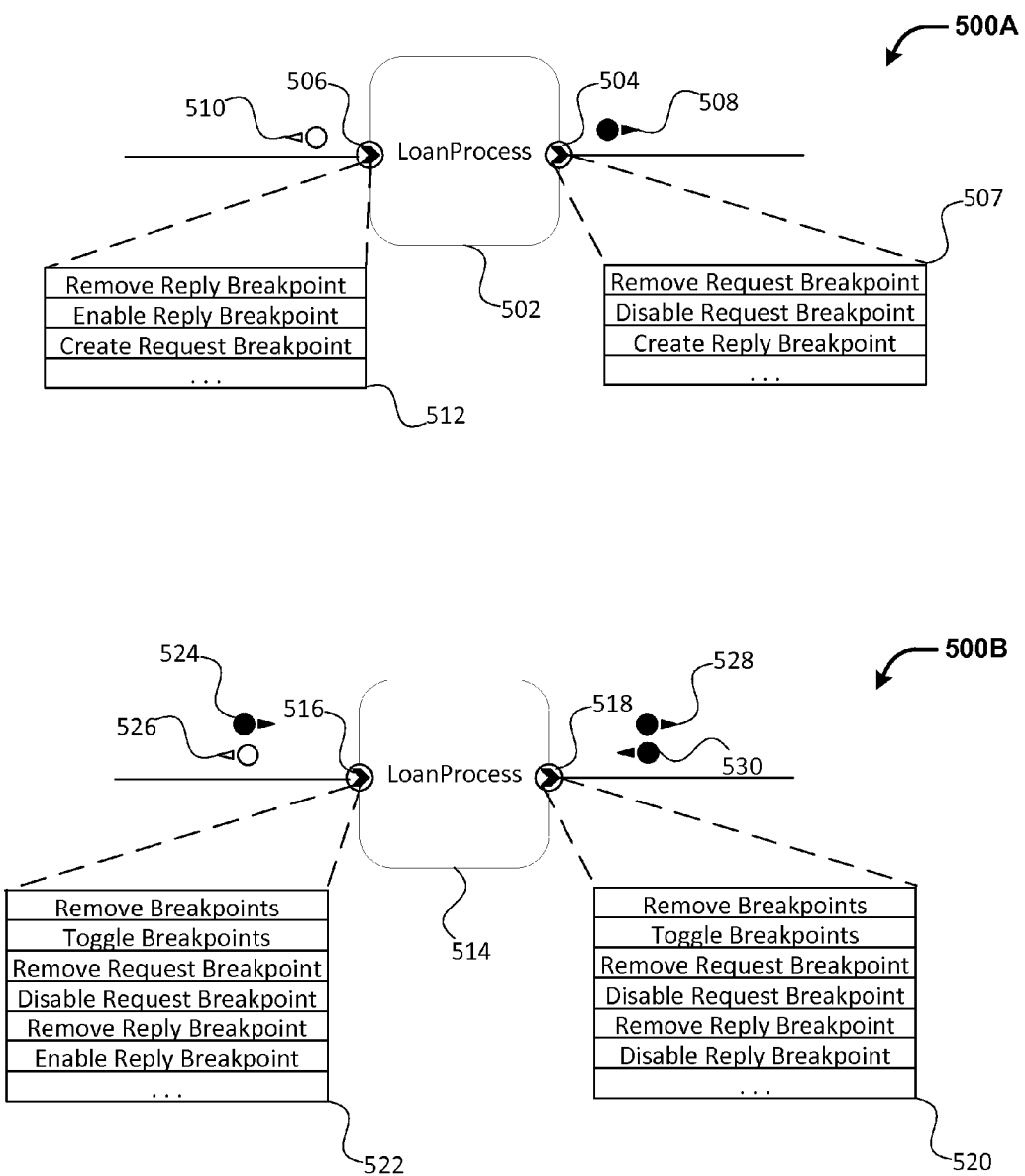
FIG. 5 illustrates example GUIs used to configure breakpoints, in accordance with at least two embodiments.

In some embodiments, breakpoints described herein may be added, removed, enabled, disable or otherwise configured. FIG. 5 illustrates example GUIs 500A-B used to configure breakpoints, in accordance with at least one embodiment. As illustrated, a menu associated with a breakpoint location of an SCA component may be displayed in response to a user action such as right-clicking on or otherwise selecting the breakpoint location to allow a user to configure breakpoints associated with the breakpoint location. Such a menu may be context-sensitive, showing different options or menu items for under different contexts. In this example, an enabled breakpoint is illustrated in black and a disabled breakpoint is illustrated in white.

As shown in GUI 500A, an enabled request breakpoint 508 is associated with a breakpoint location 504 for component 502. In this case, the menu 507 associated with the breakpoint location 504 may include options that allow a user to remove or disable the existing request breakpoint or create a reply breakpoint. On the other hand, breakpoint location 506 is associated with a disabled reply breakpoint 510. As such, the menu 512 associated with the breakpoint location 506 may include options that allow a user to remove or enable the existing reply breakpoint, or create a request breakpoint. In some embodiments, instead of "Enable Reply Breakpoint" as shown in menu 512 or "Disable Request Breakpoint" as shown in menu 507, the menus may contain a menu item "Toggle Reply Breakpoint" or "Toggle Request Breakpoint" or "Toggle Breakpoint" to revert the status of an existing breakpoint.

As shown in GUI 500B, an enabled request breakpoint 528 and an enabled reply breakpoint 530 are associated with a breakpoint location 518 for component 514. In this case, the menu 520 associated with the breakpoint location 514 may include options that allow a user to remove both breakpoints, toggle both breakpoints, remove the request breakpoint, disable (or toggle) the request breakpoint, remove the reply breakpoint or disable (or toggle) the reply breakpoint. As another example, the breakpoint location 516 is associated with both an enabled request breakpoint 524 and a disabled reply breakpoint 526. As such, the menu 522 associated with the breakpoint location 516 may include options that allow a user to remove both breakpoints, toggle both breakpoints, remove request breakpoint, disable (or toggle) request breakpoint, remove reply breakpoint or enable (or toggle) reply breakpoint.

Figure 6:
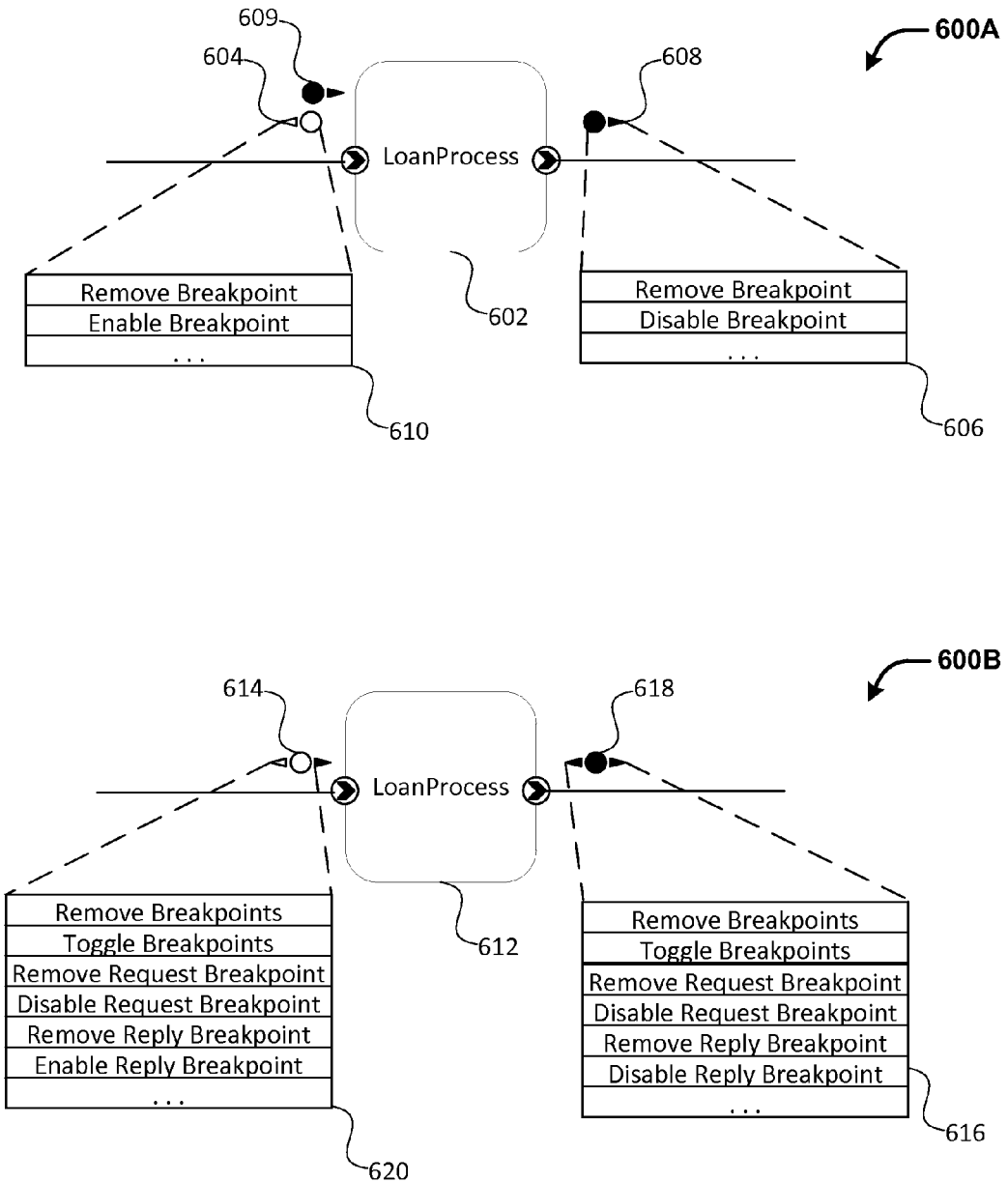
FIG. 6 illustrates example GUIs used to configure breakpoints, in accordance with at least two embodiments.

FIG. 6 illustrates additional example GUIs 600A-B used to configure breakpoints, in accordance with at least two embodiments. In the illustrated embodiment, breakpoints may be configured by menus associated with the breakpoints rather than by menus associated with the breakpoint locations, as illustrated in FIG. 5. Such breakpoint-specific menus may be displayed in response to a user action such as right-clicking or otherwise selecting a breakpoint. As shown in GUI 600A, an enabled request breakpoint 608 may be associated with a menu 606 that includes options for removing and disabling (or toggling) the breakpoint. Likewise, the menu (not shown) associated the enabled request breakpoint 609 may be similar to the menu 606. On the other hand, a disabled reply breakpoint 604 may be associated with a menu 610 that includes options for removing and enabling (or toggling) the breakpoint.

GUI 600B illustrates another embodiment of breakpoint-specific menus. In this embodiment, the breakpoints shown in GUI 600B may be implemented according to embodiment 300B of FIG. 3, where a single breakpoint may be used to either embody multiple breakpoints each with a single message flow direction or a single breakpoint with multiple message flow directions. For example, breakpoint 614 may be used to show a breakpoint that is enabled on the request path and disabled on the return path or two breakpoints, i.e., an enabled request breakpoint and a disabled reply breakpoint. The menu 620 associated with the breakpoint 614 may include options to remove both breakpoints, toggle both breakpoints, remove request breakpoint, disable (or toggle) request breakpoint, remove reply breakpoint or enable (or toggle) reply breakpoint. Likewise, breakpoint 618 may be used to show a breakpoint that is enabled on both the request path and the return path, or two breakpoints, i.e., an enabled request breakpoint and an enabled reply breakpoint. The menu 616 associated with the breakpoint 618 may include options to remove both breakpoints, toggle both breakpoints, remove request breakpoint, disable (or toggle) request breakpoint, remove reply breakpoint or disable (or toggle) reply breakpoint.

In various embodiments, menu associated with a breakpoint location or a breakpoint may include more or less options than discussed herein. In an embodiment, a breakpoint may be added to a breakpoint location without specifying a message flow direction. Such a breakpoint may be treated in a configurable default manner (e.g., as a request breakpoint, a reply breakpoint or both). In another embodiment, a message flow direction may be added to a directionless breakpoint, for example, via a menu associated with the breakpoint. In another embodiment, menus specific to a particular direction may be displayed in response to a user action such as right-clicking on or selecting an arrow that indicates a message flow direction. Such a direction-specific menu may be similar to the breakpoint-specific menus described in connection with FIG. 5.

Figure 7:
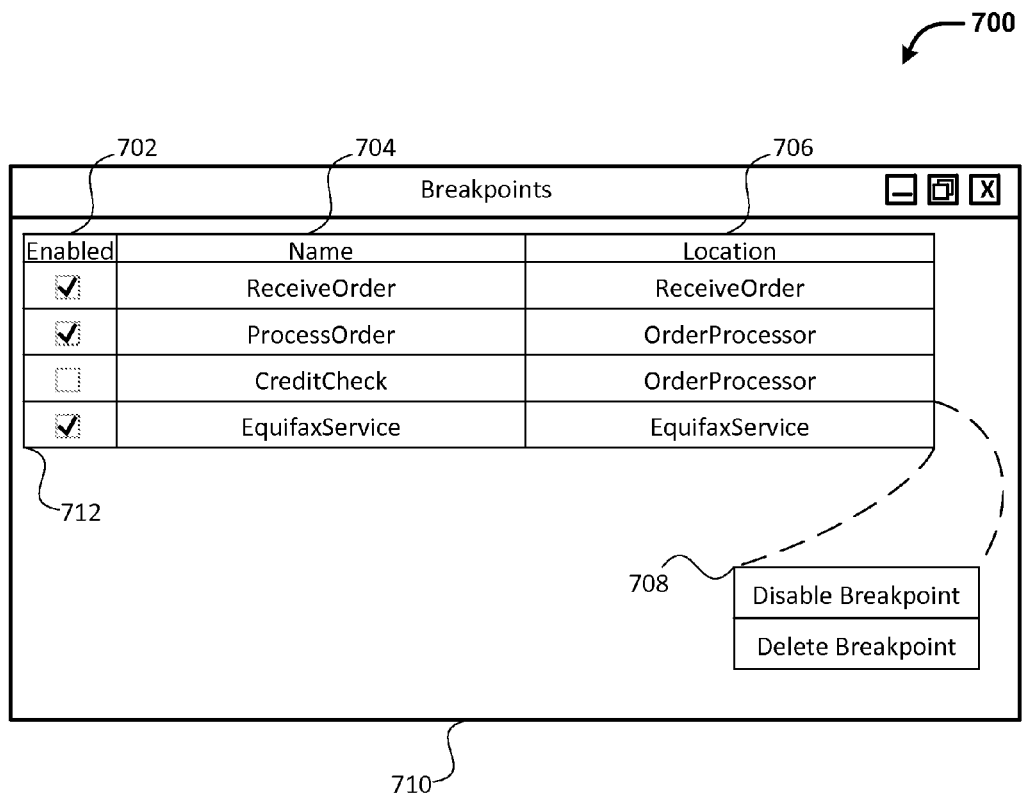
FIG. 7 illustrates another example GUI for configuring breakpoints, in accordance with at least one embodiment.

FIG. 7 illustrates another example GUI 700 for configuring breakpoints, in accordance with at least one embodiment. In this example, a breakpoint window 710 includes a table 712, each row of which may provide detailed information for a breakpoint currently associated with an application. The detailed information may include for a given breakpoint may include a status field 702 that indicates (e.g., via a checkbox control) whether a given breakpoint is enabled or disabled, a name field 704 that displays the name of the breakpoint and a location field 706 that shows the location of the breakpoint. Some or all of the breakpoint information may be editable. For example, a breakpoint may be enabled or disabled by editing the status field of a breakpoint, or via a context-sensitive menu 708 associated with each row of the table 712. The name of a breakpoint may be editable. Additionally, a breakpoint may be deleted by highlighting the corresponding row in the table 712 and press the "Delete" key or by using the context-sensitive menu 708 associated with the row. Other operations associated with breakpoints may also be provided. Such operations may include adding new breakpoints, changing breakpoint locations and the like.

Figure 8:
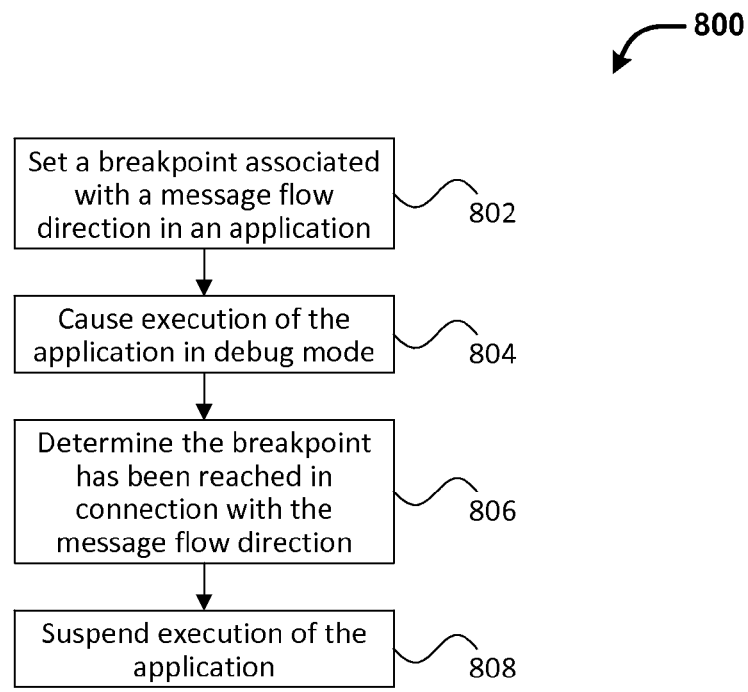
FIG. 8 illustrates an example process for debugging an application, in accordance with at least one embodiment.

FIG. 8 illustrates an example process 800 for debugging an application, in accordance with at least one embodiment. Some or all of the process 800 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The order in which the operations are described is not intended to be construed as a limitation, and any number of the described operations can be combined in any order and/or in parallel to implement the processes. In some embodiments, aspects of process 800 may be implemented by a debugging system such as the SCA debugging framework 104 discussed in connection with FIG. 1.

In an embodiment, process 800 includes setting a breakpoint associated with a message flow direction in an application. The application may include a component-based application such as an SCA composite application described herein or any other types of application. In some embodiments, setting a breakpoint may include identifying a breakpoint location where a breakpoint may be set. For example, such a breakpoint location may include the service or reference point of a composite or component in an SCA composite application. In an embodiment, the breakpoint location may be illustrated in a graphical representation of the application in a GUI. Using the GUI, a user may specify one or more breakpoints associated with the breakpoint location, each of the breakpoints associated with a distinct message flow direction, such as illustrated in connection with FIG. 4.

In an implementation, directional breakpoints described herein may be implemented based on a location object with the following data structure:

```
CompositeLocation {
    String identifier;
    CompositeReference ref;
    Map<String,String> attributes;
}
```

In the data structure, the identifier field may be used to uniquely identify the location object. In an embodiment, the identifier field may include a combination of the distinct name of the composite (e.g., including a partition for the composite application, the name of the composite, the revision number of the composite) and service or reference of a component or composite. In other embodiment, the identifier field may include a unique global identifier or other unique alpha-numeric strings.

In an embodiment, the ref field may be used to (e.g., by a debugger) to look up the source code associated with the location in the application. In a text-based or line-based debugger (e.g., where the debugging performed line-by-line on the source code of an application), the ref field may include a source file name and a line number. However, in a diagram-based debugger such as the SCA debugger described herein, the ref field may not include such information.

In an embodiment, the attributes field may be implemented by a map of name-value pairs of attributes. The attributes may be used to further qualify a location without necessitating an excessively complex descriptive identifier field. One of such attributes may be a direction attribute for message flow direction. The value of the direction attribute (e.g., request or response) may indicate whether the location is encountered for handling a request message or a response message. Such a direction attribute may be useful for supporting multiple distinct breakpoints at a single logical breakpoint location, one for each distinct message flow direction. For example, in an embodiment, each breakpoint may be implemented as a location object described above. Thus, distinct breakpoints for the same logical breakpoint location may share the same identifier and/or ref fields but with distinct direction values for their attributes fields.

Still referring to FIG. 8, in an embodiment, after a user finishes adding directional breakpoints, the user may initiate a debugging session where the application is executed 804 in a debugging mode, for example, by attaching a debugging client to a running instance of the application, starting an instance from the debugger client or the like. In an embodiment, the debugging client connects to a debug server such as the server component 108 of an SCA debugger framework via a remote debugging session. An instance of the application (e.g., a web service) may be instantiated and executed when the application is invoked (e.g., by a request sent from a web browser or a remote or local process). In various embodiments, the instance of the application may be executed in a debug mode so as to provide debugging information and/or the ability for a user to control the execution of the application.

In an embodiment, process 800 includes determining 806 that the breakpoint has been reached in connection with the message flow direction associated with the breakpoint. In an embodiment, breakpoint information may be stored in memory, a configuration file, local or remote data store or the like. Such debugger configuration information may be provided to a debug server or a process that monitors the execution of the application so that determination may be made during the execution of the application whether the breakpoint has been reached. In an embodiment, a process executing the application monitors whether the breakpoint is reached by comparing the currently location of the execution to the breakpoint location and the message flow direction associated with the breakpoint to determine if there is a match. In some embodiments, the source code of the application may be modified such that when the instruction or instructions at the breakpoint location may be replaced with a predetermined instruction instructions such that when the predetermined instruction or instructions are executed, it can be determined (e.g., via an exception thrown by a process executing the application) that the breakpoint has been reached.

In an embodiment, process 800 includes suspending 808 execution of the application once it is determined that the breakpoint has been reached. In some embodiments where the debugging is executed remotely, a debug server may generate a debug event that indicates the reach of the breakpoint. The debug event may be provided to a debug client, which may alert a user of the suspension of the application, for example, in a graphical debugger such as an IDE discussed herein. In other embodiments, the debugger client may receive the debugger event from a process running locally.

After the application is suspended, in some embodiments, the user may perform a variety of debugging operations such as inspecting and/or changing the state of the suspended application (e.g., values of variables, parameters or messages, stack information), proceeding with the execution of the application in various manners (e.g., stepping into, stepping over or continuing the execution) and the like. In some embodiments, debugger client may communicate with a debugger server to facilitate the fulfillment of such user-initiated debugging actions.

Figure 9:
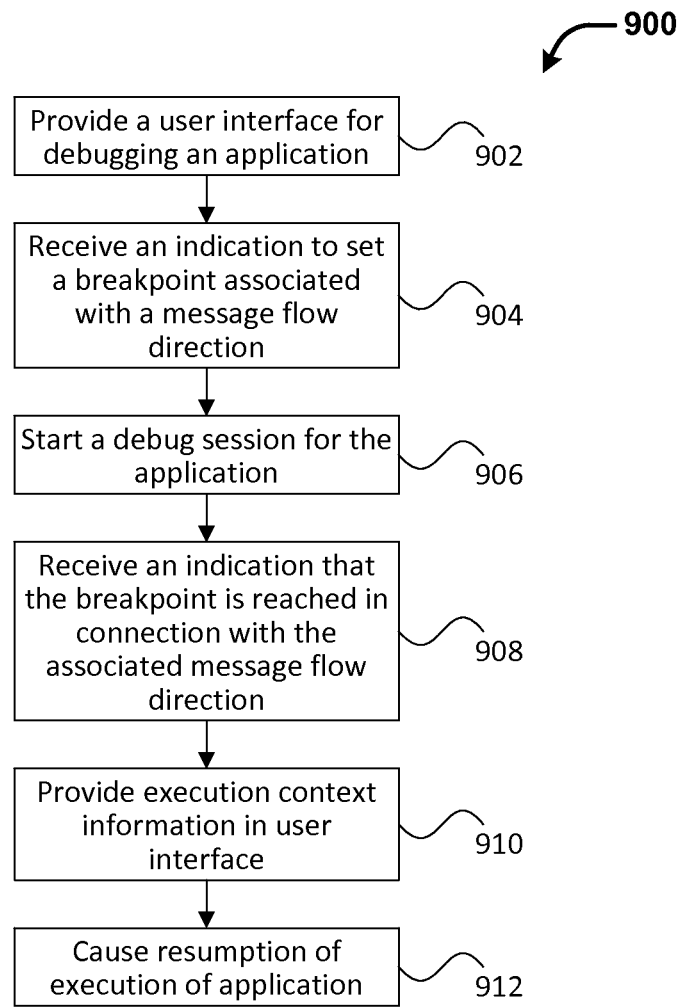
FIG. 9 illustrates an example process for debugging an application, in accordance with at least one embodiment.

FIG. 9 illustrates an example process 900 for debugging an application, in accordance with at least one embodiment. In some embodiments, aspects of process 900 may be implemented by a debugger client such as the client component 106 of a debugger framework 104 discussed in connection with FIG. 1.

In an embodiment, process 900 includes providing 902 a user interface such as a GUI or a command-line tool for debugging an application. In some embodiments, the user interface may provide a graphical representation of the application such as illustrated in FIG. 2. Using the interface, a user may add, remove, enable, disable and otherwise configure breakpoints such as according to the methods described herein and illustrated in FIGS. 4-7. The user interface may also allow a user to perform other debugging-related operations such as viewing and/or editing state information associated with execution of the program (e.g., stack, variables).

In an embodiment, process 900 includes receiving 904 an indication to set a breakpoint associated with a message flow direction in the application. Such an indication may be received, for example, when a user selects "Create Request Breakpoint" from menu 406 as illustrated in FIG. 4. As another example, such an indication may be received when a user enables a previously disabled breakpoint. In some embodiments, the message flow direction associated with a breakpoint may be provided by default (which may be configurable) or by specified by a user. In an embodiment, a user may be allowed to set one or more breakpoints simultaneously.

In an embodiment, process 900 includes starting 906 a debug session. As described above in connection with FIG. 8, in some embodiments, starting 906 a debug session may include causing the executing of an instance of the application to be debugged locally or remotely, by attaching to a running instance or staring an instance from a debugger which may include an IDE, a command-line tool or the like. In some embodiments, starting a debug session may include rebuilding the application in debug mode if the application has been changed and/or deploying the application (e.g., to a debug server). In various embodiments, up-to=date breakpoint information (e.g., where a breakpoint is set and for which message flow direction) may be maintained to enable suspension of the execution of the application at suitable time.

In an embodiment, process 900 includes receiving 908 an indication that the breakpoint has been reached in connection with the message flow direction associated with the breakpoint. Such an indication may be provided after the execution of the application has been suspended or paused by a local or remote process. Upon receiving such an indication, execution context information associated with the suspended application may be provided 910 to the user in the user interface. For example, such information may include the current location of execution, the current call stack information, values of variables, parameters or messages and the like.

In some embodiments, process 900 may include causing 912 resumption of the execution of the application, for example, in response to a user's debug command such as stepping into or over the current routine or component, continue execution of the application until the next breakpoint and the like. In some embodiments, a debugger client may provide a message or request to a remote or local process to resume executing the application. In some embodiments, one or more of steps 908-912 may be repeated when more breakpoints are encountered until the execution of the application finishes or is terminated, for example, due to errors or by the user.

Figure 10:
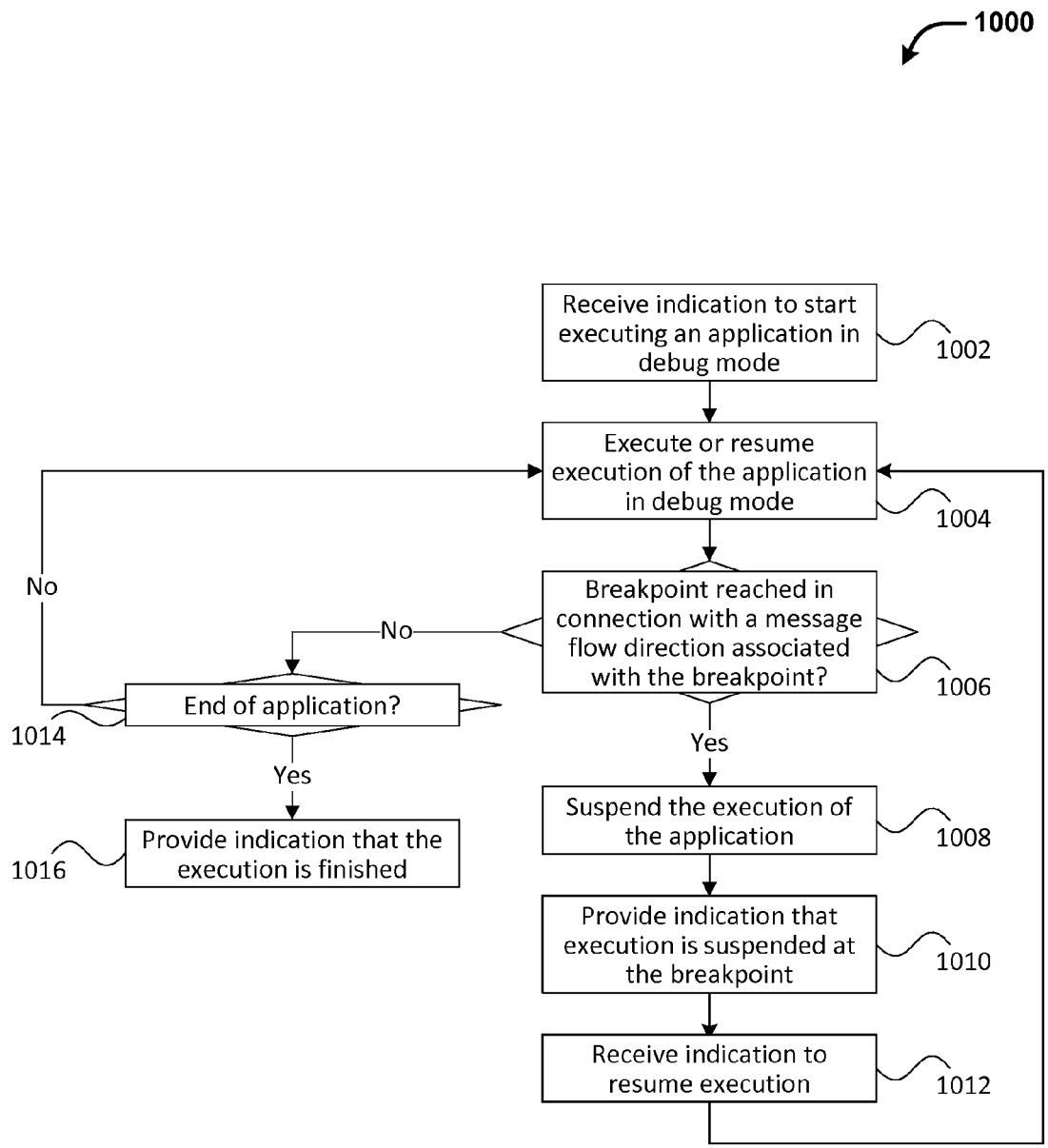
FIG. 10 illustrates an example process for debugging an application, in accordance with at least one embodiment.

FIG. 10 illustrates an example process 1000 for debugging an application, in accordance with at least one embodiment. In some embodiments, aspects of process 1000 may be implemented by a debugger server such as the server component 108 of a debugger framework 104 discussed in connection with FIG. 1.

In an embodiment, process 1000 includes receiving 1002 an indication to start executing an application (e.g., an SCA composite application) in debug mode. In some embodiments, an instance of the application may be invoked by a local or remote process such as via web service calls or application programming interface (API) calls. In response to such an indication, an instance of the application may be executed 1004 in debug mode. In various embodiments, the execution may be based on one or more configurable parameters provided by default or specified by the process invoking the application.

In an embodiment, process 1000 includes determining 1006 whether an active or enabled breakpoint has been reached in connection with a message flow direction associated with the breakpoint. As discussed above, a system implementing process 1000 (such as a debugger server) may have access to the current breakpoint information (e.g., locations, associated message flow directions and the like). Such information may be compared with the execution information to determine whether an active or enabled breakpoint has been reached. If it is determined that an active breakpoint has been reached, process 1000 includes suspending 1008 the execution of the application and providing 1010 an indication or a message (e.g., to a debugger client) that the execution of the application has been suspended or paused at the particular breakpoint. Subsequently, process 1000 may include receiving 1012 an indication to resume the execution of the application. Such an indication may be received in response to a user's command to step into, step over or continue the execution in a debugger client such as described in connection with FIG. 9. In response to such an indication, process 1000 includes resuming 1004 execution of the application in a manner (e.g., step into, step over or continue) dictated at least in part by the received indication. Alternatively, process 1000 may include terminating or resuming the execution of the application after a configurable timeout period expires without receiving any indication to resume execution.

Otherwise, if it is determined 1006 that an active breakpoint has not been reached but that it is determined 1014 that the execution of the application is finished or terminated, process 1000 includes providing 1016 an indication or a message (e.g., to a debugger client) that the execution of the application is finished so that such information may be provided to a user, for example. Otherwise, if it is determined 1014 that the execution of the application is not finished, process 1000 includes continuing executing 1004 the application until an active breakpoint is reached or until the execution finishes.

Variations of the techniques described above are contemplated as being within the scope of the present invention. For instance, functionalities for providing directional breakpoints may be provided for any component-based application not limited to SCA composite application, by any diagram-based development environment.

Figure 11:
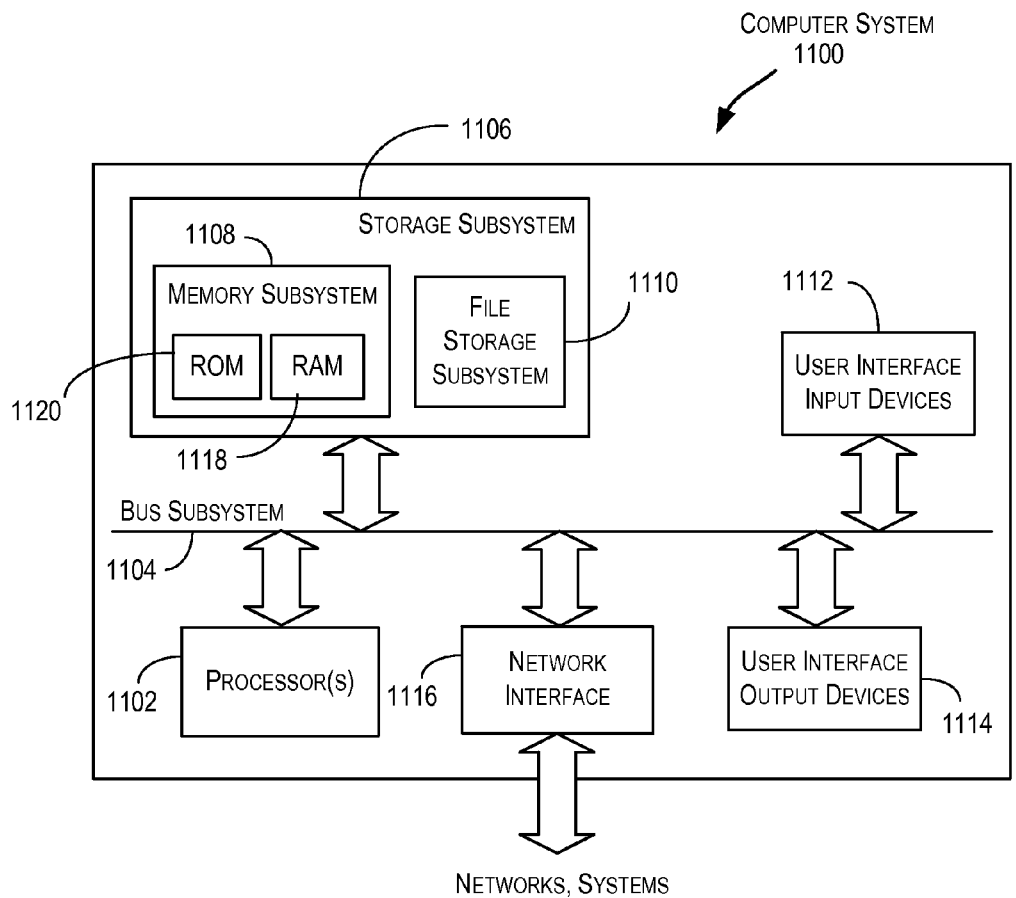
FIG. 11 is a simplified block diagram of a computer system that may be used to practice an embodiment of the present invention.

FIG. 11 is a simplified block diagram of a computer system 1100 that may be used to practice an embodiment of the present invention. The computer system 1100 may be used, for instance, to compose, send, distribute, and/or receive electronic messages. Computer system 1100 may serve as a processing system and/or a client system depicted in FIG. 2. As shown in FIG. 1, computer system 1100 includes a processor 1102 that communicates with a number of peripheral subsystems via a bus subsystem 1104. These peripheral subsystems may include a storage subsystem 1106, comprising a memory subsystem 1108 and a file storage subsystem 1110, user interface input devices 1112, user interface output devices 1114, and a network interface subsystem 1116.

Bus subsystem 1104 provides a mechanism for letting the various components and subsystems of computer system 1100 communicate with each other as intended. Although bus subsystem 1104 is shown schematically as a single bus, alternative embodiments of the bus subsystem may utilize multiple busses.

Network interface subsystem 1116 provides an interface to other computer systems, networks, and portals. Network interface subsystem 1116 serves as an interface for receiving data from and transmitting data to other systems from computer system 1100. The network interface subsystem 1116 may be used, for example to send and receive electronic messages over a network.

User interface input devices 1112 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to computer system 1100. A user may use an input device to compose content for electronic messages and/or to specify and/or exclude recipients, in accordance with various embodiments.

User interface output devices 1114 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 1100. Content of electronic messages may be displayed using output devices 1114.

Storage subsystem 1106 provides a computer-readable medium for storing the basic programming and data constructs that provide the functionality of the present invention. Software (programs, code modules, instructions) that, when executed by a processor, provide the functionality of the present invention may be stored in storage subsystem 1106. These software modules or instructions may be executed by processor(s) 1102. Storage subsystem 1106 may also provide a repository for storing data used in accordance with the present invention, for example, the data stored in the diagnostic data repository. For example, storage subsystem 1106 provides a storage medium for persisting one or more ontologies. Storage subsystem 1106 may comprise memory subsystem 1108 and file/disk storage subsystem 1110.

Memory subsystem 1108 may include a number of memories including a main random access memory (RAM) 1118 for storage of instructions and data during program execution and a read-only memory (ROM) 1120 in which fixed instructions are stored. File storage subsystem 1110 provides persistent (non-volatile) storage for program and data files, and may include a hard disk drive, a floppy disk drive along with associated removable media, a Compact Disk Read-Only Memory (CD-ROM) drive, an optical drive, removable media cartridges, and other like storage media.

Computer system 1100 can be of various types including a personal computer, a portable computer, a workstation, a network computer, a mainframe, a kiosk, a mobile device, a tablet device, and a server or any other data processing system. Due to the ever-changing nature of computers and networks, the description of computer system 1100 depicted in FIG. 11 is intended only as a specific example for purposes of illustrating the preferred embodiment of the computer system. Many other configurations having more or fewer components than the system depicted in FIG. 11 are possible.

Figure 12:
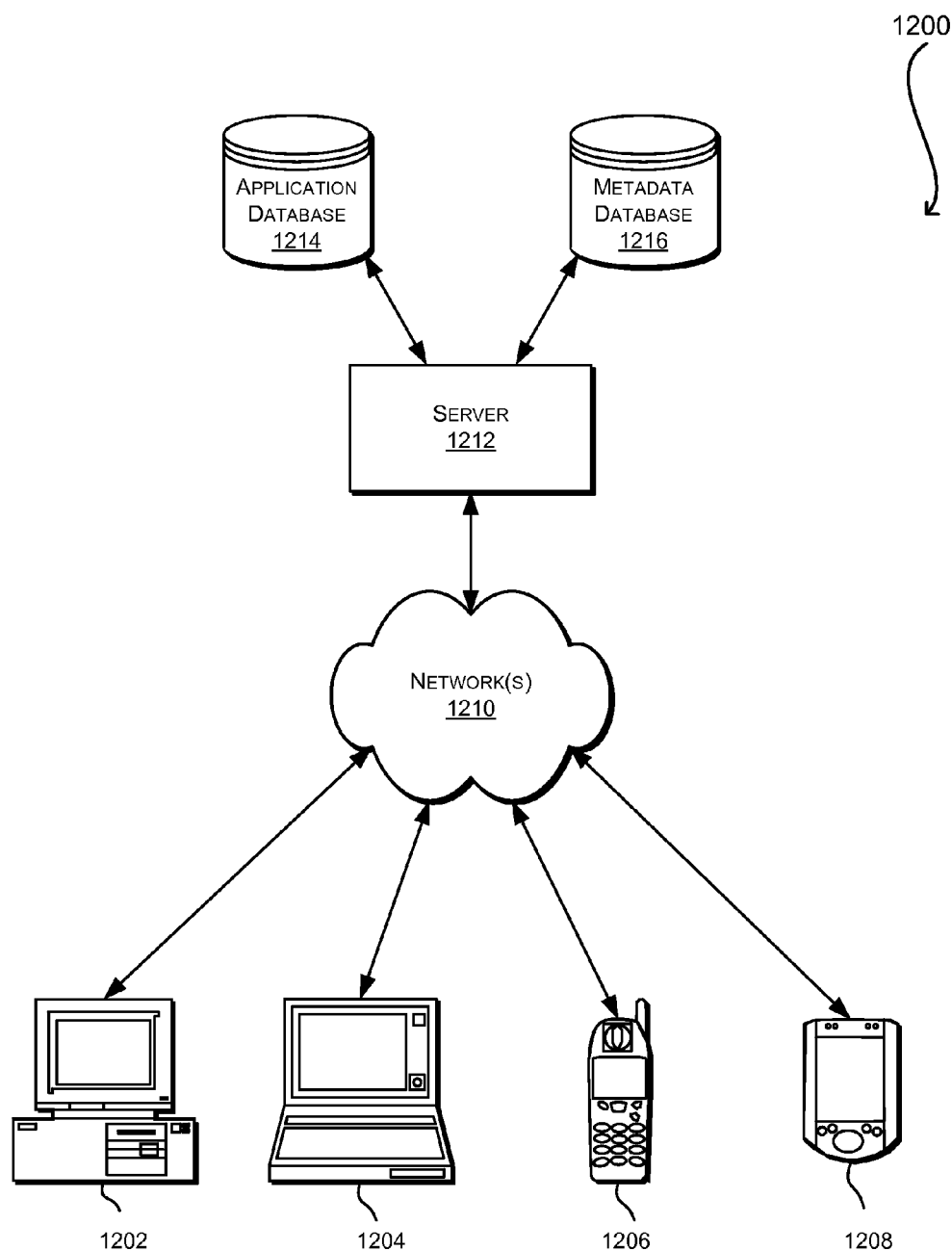
FIG. 12 is a simplified block diagram illustrating components of a system environment that may be used in accordance with an embodiment of the present

FIG. 12 is a simplified block diagram illustrating components of a system environment 1200 that may be used in accordance with an embodiment of the present disclosure. As shown, system environment 1200 includes one or more client computing devices 1202, 1204, 1206, 1208, which are configured to operate a client application such as a web browser, proprietary client (e.g., Oracle Forms), or the like. In various embodiments, client computing devices 1202, 1204, 1206, and 1208 may interact with a server 1212.

Client computing devices 1202, 1204, 1206, 1208 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 1202, 1204, 1206, and 1208 may be any other electronic device, such as a thin-client computer, Internet-enabled gaming system, and/or personal messaging device, capable of communicating over a network (e.g., network 1210 described below). Although example system environment 1200 is shown with four client computing devices, any number of client computing devices may be supported. Other devices such as devices with sensors, etc. may interact with server 1212.

System environment 1200 may include a network 1210. Network 1210 may be any type of network familiar to those skilled in the art that can support data communications using any of a variety of commercially-available protocols, including without limitation TCP/IP, SNA, IPX, AppleTalk, and the like. Merely by way of example, network 1210 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 1200 also includes one or more server computers 1212 which may be general purpose computers, specialized server computers (including, by way of example, PC servers, UNIX servers, mid-range servers, mainframe computers, rack-mounted servers, etc.), server farms, server clusters, or any other appropriate arrangement and/or combination. In various embodiments, server 1212 may be adapted to run one or more services or software applications described in the foregoing disclosure. For example, server 1212 may correspond to a server for performing processing described above according to an embodiment of the present disclosure.

Server 1212 may run an operating system including any of those discussed above, as well as any commercially available server operating system. Server 1212 may also run any of a variety of additional server applications and/or mid-tier applications, including HTTP servers, FTP servers, CGI servers, Java servers, database servers, and the like. Example database servers include without limitation those commercially available from Oracle, Microsoft, Sybase, IBM and the like.

System environment 1200 may also include one or more databases 1214, 1216. Databases 1214, 1216 may reside in a variety of locations. By way of example, one or more of databases 1214, 1216 may reside on a non-transitory storage medium local to (and/or resident in) server 1212. Alternatively, databases 1214, 1216 may be remote from server 1212, and in communication with server 1212 via a network-based or dedicated connection. In one set of embodiments, databases 1214, 1216 may reside in a storage-area network (SAN) familiar to those skilled in the art. Similarly, any necessary files for performing the functions attributed to server 1212 may be stored locally on server 1212 and/or remotely, as appropriate. In one set of embodiments, databases 1214, 1216 may include relational databases, such as databases provided by Oracle, that are adapted to store, update, and retrieve data in response to SQL-formatted commands.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope.

Illustrative methods and systems for providing statistically triggered data placement are described above. Some or all of these systems and methods may, but need not, be implemented at least partially by architectures such as those shown in FIGS. 1-9 above.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A computer-implemented method of debugging an application, comprising:
    providing, by a computer system configured with executable instructions, a user interface for a user to specify a breakpoint associated with a single breakpoint location in a Service Component Architecture application and a plurality of message flow directions associated with the single breakpoint location;
    receiving, via the user interface, a selection of the plurality of message flow directions for the single breakpoint location; and
    causing an execution of the application to be suspended when the single breakpoint location is reached in any of the plurality of message flow directions based at least in part on the received selection of the plurality of message flow directions.

2. The computer-implemented method of claim 1, wherein the user interface includes a graphical user interface (GUI).

3. The computer-implemented method of claim 1, wherein the application is based on Service-Oriented Architecture (SOA).

4. The computer-implemented method of claim 3, wherein the breakpoint location is one of composite service, composite reference, component service or component reference.

5. The computer-implemented method of claim 1, wherein the single breakpoint location is associated with a component of the application and at least one of the plurality of message flow directions is associated with a message exchange pattern for the component.

6. The computer-implemented method of claim 1, wherein at least one of the plurality of message flow directions is associated with request processing or with response processing.

7. A computer system for debugging an application, comprising:
   one or more processors; and
   memory, including instructions executable by the one or more processors to cause the computer system to at least:
      provide a user interface for enabling a single breakpoint location in a Service Component Architecture application associated with a plurality of message flow directions;
      receive, via the user interface, a selection of at least one of the plurality of message flow directions for the single breakpoint location; and
      cause an execution of the application to be suspended when the single breakpoint location is reached in any of the plurality of message flow directions in connection with the received selection of the at least one of the plurality of message flow directions.

8. The computer system of claim 7, wherein providing the user interface includes providing an integrated development environment (IDE).

9. The computer system of claim 7, wherein the user interface allows a user to create a request breakpoint, a reply breakpoint or both.

10. The computer system of claim 7, wherein the user interface allows a user to add, remove, enable or disable one or more breakpoints.

11. The computer system of claim 7, wherein the instructions further cause the computer system to provide, via the user interface, context information related to the suspended execution of the application.

12. The computer system of claim 7, wherein the instructions further cause the computer system to resume the execution of the application based on user input received via the user interface.

13. One or more non-transitory computer-readable storage media having stored thereon executable instructions that, when executed by one or more processors of a computer system, cause the computer system to at least:
   provide a user interface for a user to specify a breakpoint associated with a single breakpoint location in a Service Component Architecture application and a plurality of message flow directions associated with the single breakpoint location;
   receive, via the user interface, a selection of the plurality of message flow directions for the single breakpoint location; and
   cause an execution of the application to be suspended when the single breakpoint location is reached in any of the plurality of message flow directions in connection with the received selection of the plurality of message flow directions.

14. The one or more computer-readable storage media of claim 13, wherein the instructions further cause the computer system to display, via the user interface, a graphical representation of the breakpoint and the selected message flow direction.

15. The one or more computer-readable storage media of claim 13, wherein the instructions further cause the computer system to display, via the user interface, a graphical representation of one or more breakpoint locations on a second graphical representation of the application where a potential breakpoint can be set.

16. The one or more computer-readable storage media of claim 13, wherein the application is based at least in part on a Service-Oriented Architecture model.

17. The one or more computer-readable storage media of claim 13, wherein the single breakpoint location is reachable by the execution of the application in connection with the selected plurality of message flow directions.

18. The one or more computer-readable storage media of claim 13, wherein the execution of the application is not suspended in connection with a second message flow direction that is not one of the selected plurality of message flow directions.

* * * * *